United States Patent [19]

Gaku et al.

[11] Patent Number: 5,186,880
[45] Date of Patent: Feb. 16, 1993

[54] PROCESS FOR PRODUCING CYANATE ESTER RESIN CURE PRODUCT

[75] Inventors: Morio Gaku; Mitsuru Nozaki, both of Tokyo, Japan

[73] Assignee: Mitsubishi Gas Chemical Company, Inc., Tokyo, Japan

[21] Appl. No.: 547,207

[22] Filed: Jul. 3, 1990

[30] Foreign Application Priority Data

Jul. 4, 1989 [JP] Japan ................................. 1-171188

[51] Int. Cl.$^5$ ...................... B29C 39/38; B29C 71/02
[52] U.S. Cl. .................. 264/236; 264/331.19; 524/176; 524/178; 524/249; 524/398; 524/399; 528/422
[58] Field of Search ............ 264/236, 331.12, 331.16, 264/331.19; 524/174, 175, 176, 177, 178, 249, 394, 398, 399; 526/90, 95, 103, 210, 211, 213, 216, 292.8, 297, 299, 300; 528/422

[56] References Cited

U.S. PATENT DOCUMENTS

| | | | |
|---|---|---|---|
| 3,694,410 | 9/1972 | Oehmke | 528/422 |
| 4,195,132 | 3/1980 | Sundermann et al. | 528/422 X |
| 4,528,366 | 7/1985 | Woo et al. | 528/422 |
| 4,608,434 | 8/1986 | Shimp | 528/422 |
| 4,740,343 | 11/1988 | Gaku et al. | 264/236 X |
| 4,785,075 | 11/1988 | Shimp | 528/422 |

FOREIGN PATENT DOCUMENTS

| | | |
|---|---|---|
| 298742 | 1/1989 | European Pat. Off. . |
| 2460228 | 7/1975 | Fed. Rep. of Germany . |
| 2318891 | 2/1977 | France . |
| 42-19458 | 9/1966 | Japan . |
| 44-1222 | 1/1968 | Japan . |
| 44-4791 | 2/1968 | Japan . |
| 49-16800 | 4/1974 | Japan . |
| 1526035 | 9/1978 | United Kingdom . |

OTHER PUBLICATIONS

English-Language Abstract of Japanese Reference 01-141,942 (Published Jun. 2, 1989).

*Primary Examiner*—Leo B. Tentoni
*Attorney, Agent, or Firm*—Venable, Baetjer, Howard & Civiletti

[57] ABSTRACT

The invention is a process for making a cyanate ester resin cured product by (1) adding organic metal compound (a) and triethanol amine(b) to a cyanate resin composition which is flowable at a temperature of not more than 50° C. comprising as its main component polyfunctional cyanate ester compound having at least two cyanate groups, thereby forming a cyanate resin composition having 0.1–5% by weight of (a) and 0.1–5% by weight of (b), which is flowable at a temperature of not more than 50° C.; (2) molding the composition at a temperature of not more than 50° C. (3) primary curing at a temperature of not more than 50° C.; and (4) post-curing at a temperature of not less than 170° C.

8 Claims, No Drawings

PROCESS FOR PRODUCING CYANATE ESTER RESIN CURE PRODUCT

BACKGROUND OF THE INVENTION

This invention relates to a process for producing a cyanate ester resin cure product which comprises molding a cyanate ester resin composition to a desired shape at a temperature of not more than 50° C., and preferably at room temperature to bring about primary curing, and then post-curing the resin molding at a temperature of not less than 170° C. The cure products can be used for laminates, molded products, filament windings, coating materials, adhesives, cast products, and a variety of industrial uses.

It has been known that a polyfunctional cyanate ester compound can completely cured through forming of symtriazine ring by heating it in the presence or absence of an organic metal compound catalyst through forming of symtriazine ring. However, it was necessary to heat the cyanate ester compound at a temperature of not less than 150° C. in the prior method using a conventional amount of catalyst.

Japanese Patent Publication (KOKOKU) No. 49-16800 discloses that the mixture of bisphenol A dicyanate (2 g) and methylene chloride (2 g) is heated in the presence of 1 mol % of salicylaldehyde cobalt [Co(-Sal)$_2$] (metallic chelate catalyst) per the dicyanate at 25° C. for 20 hours to form a polymer. However, if metallic chelate compounds or other organometallic salts are incorporated as catalysts in such amounts that primary curing is completed in about one or two days to become ready for post-curing, the time required for the mixture to become substantially nonflowable at a temperature of not more than 50° C. is extremely shortened, less than several tens of minutes. Therefore, such metallic chelate compounds are unsuitable for use in practical applications. In addition, when the resin composition is used without using much solvent, the polymerization reaction is rapidly caused due to the reaction heat immediately after incorporating the catalyst into the resin composition and finally runaway reaction may occur; and in some case, there was a possibility that fire may be caused.

It was known that cyanato group (—O—C≡N) of a polyfunctional cyanate ester compound reacts with an amino group, a hydroxy group, or carboxylate group at relatively low temperature. It was also known to prepare the cured resin by utilizing such properties of the polyfunctional cyanate ester compound. For example, Japanese Patent Publication (KOKOKU) Nos. 42-19458 and 44-1222 disclose that straight or network synthetic resins can be obtained through isourea ester group by blending a polyfunctional cyanate ester compound and a mono- or polyfunctional amine compound having cyanato groups and primary or secondary amine groups in stoichiometric amounts, respectively are blended, followed by reacting these group in the presence of a solvent. Japanese Patent Publication (KOKOKU) No. 44-4791 discloses that straight or network synthetic resins can be prepared through imido carbonate ester groups by blending a polyfunctional cyanate ester having cyanato groups and a polyvalent aliphatic acid or an aromatic hydroxy compound in stoichiometric amounts, followed by reacting them during heating in the presence of a solvent. However, when a substantial amount of these catalysts are used in these methods, the period when the substantially flowability of the resulting resin composition is lost is too short, as in the case of adding the above-mentioned metal compound to the system; and in addition runaway reaction tends to be caused. In order to solve such problems, a solvent must be used. In addition, linking groups of the resulting resin compositions contain active hydrogens and the imido carbonate ester groups start to heat-decompose at a temperature of about 150° C.

SUMMARY OF THE INVENTION

The present inventors have conducted research on processes for producing heat resistant cure products having a glass transition temperature of not less than 150° C. in which a primary cure product having the desired shape can be obtained by curing a resin composition at a temperature as relatively low as 50° C., and the primary cure product can be post-cured without substantially changing the shape of the primary cure product to form the post-cure product. As a result, curing catalyst has been found comprising an organic metal compound and triethanol amine. This invention is based on that discovery.

This invention relates to a process for producing a cyanate ester resin cure product which comprises:

(i) a step of adding 0.1–5% by weight, preferably 0.5–2% by weight, of an organic metal compound (Component A) and 0.1–5% by weight, preferably 0.5–4% by weight, of triethanol amine (Compound B) to a cyanate resin composition, which is flowable at a temperature of not more than 50° C., comprising a polyfunctional cyanate ester compound having at least two cyanato groups in its molecule as a main component, thereby forming a resin composition which is flowable at a temperature of not more than 50° C.;

(ii) a step of molding the resin composition at a temperature of not more than 50° C. to cause primary curing of the resin composition; and (iii) a step of post-curing the resin composition at a temperature of not less than 170° C.

DETAILED DESCRIPTION OF THE INVENTION

The polyfunctional cyanate ester compounds having at least two cyanato groups in its molecule are represented by the formula:

$$R(OCN)_m \qquad (1)$$

wherein R is an aromatic organic group and the cyanato groups are directly bonded to the aromatic ring; and m is an integer of 2–5.

Examples of the polyfunctional cyanate compounds include 1,3- or 1,4-dicyanatobenzene, 1,3,5-tricyanatobenzene, 1,3-, 1,4-, 1,6-, 1,8-, 2,6- or 2,7-dicyanatonaphthalene, 1,3,6-tricyanatonaphthalene, 4,4'-dicyanatobiphenyl, bis(4-dicyanatophenyl)methane, bis(3,5-dimethyl-4-dicyanatophenyl)methane, 2,2-bis(4-cyanatophenyl)propane, 2,2-bis(3,5-dichloro-4-cyanatophenyl)propane, 2,2-bis(3,5-dibrome-4-cyanatophenyl)propane, 2,2-bis(3,5-dimethyl-4-cyanatophenyl)propane, bis(4-cyanatophenyl)ether, bis(4-cyanatophenyl)ethane, bis(4-cyanatophenyl)thioether, bis(4-cyanatophenyl)sulfone, tris(4-cyanatophenyl)phosphate, a polyfunctional novolak cyanate obtained by reacting a novolak with a halogenated cyanide, a polyfunctional polycarbonate cyanate obtained by reacting a hydroxy-terminated polycarbonate oligomer with a halogenated cyanide, a polyhydroxy styryl cyanate obtained by reacting hydroxy benzaldehyde with an alkyl-substituted pyridine, a styryl pyridine cyanate (U.S. Pat. No. 4,578,439) obtained by reacting a pyridine with a halogenated cyanide and a cyanate obtained by reacting a halogenated cyanide (U.S. Pat. No. 4,026,913 and German Patent No. 2,611,796, etc.) with a polyfunctional phenol in which the phenol is bonded to dicyclopentadiene. Other cyanate ester compounds employed in the practice of this invention are given in U.S. Pat. Nos. 3,553,244; 3,755,402; 3,740,348; 3,595,900; 3,694,410; 4,097,455 and 4,116,946 and British Patent Nos. 1,305,967 and 1,060,933 which are incorporated herein by way of reference. Of these cyanate ester compounds, 1,3- or 1,4-dicyanatobenzene monomers and 1,3,5-tricyanatobenzene monomer which are liquid or semi-solid at a temperature of not more than 50° C. and oligomers, which are liquid or semi-solid at a temperature of not more than 50° C., including oligomers obtained through sym-triazine ring by heating bis(4-dicyanatophenyl)methane, 2,2-bis(4-cyanatophenyl)-propane or bis(3,5-dimethyl-4-dicyanatophenyl)methane which is solid at room temperature are preferred.

The organic metal compounds are metal salts of organic acids, organic metallic chelate compounds (metal complexes) and alkyl metal oxides. Compounds which are compatible with the cyanate ester compounds are preferred. Examples of the organic metal compounds include salts of an organic acid such as naphthenic acid, stearic acid, octylic acid, oleic acid, butyric acid or maleic acid, and a metal such as zinc, lead, nickel, iron, tin or cobalt; chelate compounds of acetyl acetone, and a metal such as zinc, lead, nickel, iron, tin or cobalt; and alkyl tin compounds such as dibutyl tin oxide, dioctyl tin oxide or dibutyl tin acetyl acetonate.

The amount of the organic metal compound used depends on the nature of the compounds. In general, the amount may be in the range of 0.1-5 wt %, preferably 0.5-2 wt % based on the weight of the total composition.

The amount of triethanol amine used may be in the range of 0.1-5 wt %, preferably 0.5-4 wt % based on the weight of a total composition.

When each of Components A and B which are curing agent or curing catalyst for the cyanate ester compounds is used in an amount of less than 0.1 wt %, it takes two days or more to cure the cyanate ester compound at a temperature of not more than 50° C., namely without using external heating. This is not practical. When each of Components A and B is used in an amount of more than 5 wt %, the composition becomes highly viscous, just after the composition has been prepared. That is, the pot life of the composition is only 20-30 minutes. This means that coating, impregnating and molding such as casting are impossible using the composition.

When only Component A is added to the cyanate ester compound, the primary cure time to make the pot life suitable becomes too long, alternatively, if the primary cure time is made more suitable, the pot life becomes too short. These both embodiments are not practical.

When only Component B is added to the cyanate ester compound, a large amount of triethanol amine must be used. This means that the resulting product is deteriorated to a large extent.

The cyanate ester composition employed in the present process may be prepared by blending the components at a temperature of not more than 50° C., namely at room temperature. An organic peroxide which does not have an adverse effect on the room-temperature-curing may be added to the cyanate ester in order to promote the final (heating) cure. However, since the curing reaction proceeds at room temperature in the cyanate ester composition which has been prepared from the components, it is preferable for each component to be blended just before the cyanate ester composition is used. However, when the cyanate ester composition is kept at a temperature of not more than −20° C., such a curing reaction hardly proceeds.

When the components are blended, a lower-boiling point solvent, a reactive diluent or non-reactive diluent (which constitutes the resin solid component after curing) may be added to the composition. The order of adding these components is optional. Generally speaking, it is preferable for liquid or simi-solid polyfunctional cyanate ester or a polyfunctional cyanate ester resin composition to be blended with an organic metal compound and triethanol amine, which are liquid at room temperature, in the absence of a solvent. Alternatively, a polyfunctional cyanate ester compound dissolved in a lower-boiling point solvent may be used.

A liquid second compound which is reactive or non-reactive with the cyanato group of the polyfunctional may be used. The amount of the second compound used may be in the range of not more than 60 wt %, preferably less than the amount of the cyanate ester compound used. When the second compound is used in an amount of not less than 60 wt %, the rate of the primary cure which occurs at a temperature of not more than 50° C. is lowered. Examples of the liquid second compounds include epoxy resins, acrylates, methacrylates, triallyl isocyanurate, polybutadiene, diallyl phthalate, polybromo diphenyl ether and the like. Examples of the epoxy resins which are liquid at ambient temperature include amine-modified epoxy compounds such as tetraglycidyl diamino diphenyl methane (TGDDM); bis[4-(N,N-diglycidylamino)phenyl]methane, triglycidyl-p-aminophenol (TGPAP); 4-(N,N-diglycidylamino)-glycidylphenol, triglycidyl-m-aminophenol (TGMAP), diglycidyl aniline (TGA); N,N-diglycidyl aminobenzene, tetraglycidyl meta-xylilene diamine (TGMXA); 1,3-bis(N,N-diglycidyl-aminomethyl)benzene, diglycidyl tribromoaniline (or N,N-diglycidylamino-2,4,6-tribromobenzene), tetraglycidylbisaminomethyl cyclohexane (or bis(N,N-diglycidyl-aminomethyl)cyclohexane) and the like. Examples of acrylates or methacrylates include polyfunctional acrylates or methacryaltes such as neopentyl glycol acrylate, neopentyl glycol methacrylate, trimethylol propane triacrylate, trimethylol propane trimethacrylate, ethylene glycol acrylate, ethylene glycol methacrylate, triglycidyl isocyanate, triglycidoxy cyanate and the like.

The variety of thermoplastic resins rubbers or the like may be added to the cyanate ester composition in an amount of not more than 30 wt % based on the weight of the total composition in order to modify the composition. Well known additives may be added to the cyanate ester composition. Examples of the additives include woven or non-woven fabrics such as carbon fiber, glass fiber, quarts fiber ceramic fiber, aramide fiber, fluorine resin fiber, metal fiber or the like; powder of above-mentioned materials; fillers; dye stuffs; pigments; defoaming agents; surfactants; thixotropic agents; silicone powder; flame retardants and the like.

The cyanate ester composition of the present invention can be used for desired applications within pot life. The applications are as follows:

(i) The cyanate ester resin composition not containing a solvent is prepared. The composition is impregnated into woven or non-woven fabric and the primary cure of the resin is carried out to obtain prepreg. Laminate-molding of the prepreg is effected. The resulting laminates can be widely used.

(ii) Molding materials or powder coating materials are prepared by blending the components at room temperature.

(iii) Casting materials are prepared from the room-temperature-blending.

(iv) Cyanate ester composition is prepared by using a volatile solvent. The composition is coated on a substrate. The solvent is removed by air-drying to effect the primary cure. Then the post-cure is effected by heating the coating layer.

The post-cure after the primary cure is effected at a temperature of not less than 170° C., e.g., for 1–10 hours. It is preferable that the primary cured material is heated to a temperature of not less than 170° C. over 2–15 hours. In particular, it is preferable that the primary cured material is heated at a temperature of not less than 200° C. in order to impart higher glass transition temperature to the post-cured material.

The present invention is further illustrated by the following non-limiting Examples and Control Runs.

All percentages and parts in these Examples and Control Runs are by weight, unless otherwise specified.

EXAMPLE 1

Prepolymerization of dicyanate of bisphenol A (monomer) was effected at 160° C. for 4 hours to obtain prepolymer having a number average molecular weight (Mn) of 390 and a weight average molecular weight (Mw) of 1300 and a viscosity of 100 cps at 50° C. The prepolymer is referred to as TA-1.

TA-1 was heated at 40° C. and triethanol amine (TEA) dibutyl tin acetyl acetonate (SnAcAC) (organic metal compound) and zinc octoate (Zn-Oct) were added to the TA-1 as shown in Table 1. The mixture was cooled to 25° C.

The time (pot life) required for the mixture to become nonflowable at 25° C. and the time (solidifying time) required for the entire mixture to solidify at 25° C. were measured. The solidified product was post-cured by 2-hour heating at increasing temperatures of 60, 80, 100, 140 and 218° C., and thereafter its glass transition temperature (hereinafter referred to as "post-cure Tg") was measured. The measurement was carried out at rising temperature of 10° C./min, for sample size of 4–5 mm$^\phi$ and thickness of 3.5–4.5 mm by using TMA of Du Pont.

The results are shown in Table 1.

TABLE 1

| | Ex. 1 | Ex. 2 | Ex. 3 | Ex. 4 | Ex. 5 | Ex. 6 | Ex. 7 | Cont. Run 8 | Cont. Run 9 | Cont. Run 10 | Cont. Run 11 | Cont. Run 12 | Cont. Run 13 |
|---|---|---|---|---|---|---|---|---|---|---|---|---|---|
| Components | | | | | | | | | | | | | |
| TA-1 | 99 | 98.5 | 98.5 | 98 | 97 | 99.4 | 98.5 | 100 | 98 | 96 | 98 | 95 | 99 |
| SnAcAC | 0.5 | 0.5 | 1.0 | 1.0 | 2.0 | | | | 2.0 | 4.0 | | | |
| Zn—Oct | | | | | | 0.5 | 1.0 | | | | | | 1.0 |
| TEA | 0.5 | 1.0 | 0.5 | 1.0 | 1.0 | 0.1 | 0.5 | | | | 2.0 | 5.0 | |
| Pot life (hrs) | 5 | 3 | 4 | 2 | 0.7 | 5 | 0.5 | >100 | 2 | 0.3 | 8 | 0.1 | Exothermic runaway reaction occurred |
| Solidifying time (hrs) | 34 | 15 | 24 | 12 | 10 | 34 | 22 | >100 | 72 | 36 | >240 | 120 | |
| Post-cure Tg (°C.) | 230 | 230 | 230 | 230 | 230 | 225 | 225 | — | * | 230 | * | 160 | |

*: The product was deformed during the post-cure step.

EXAMPLE 2

The procedures of Example 1 were repeated except that dioctyl tin laurate (Sn-OcLa) or dibutyl tin dilaurate (Sn-BuLa) was used as an organic metal compound. The results are shown in Table 2.

TABLE 2

| | Ex. 1 | Ex. 2 | Ex. 3 | Ex. 4 | Ex. 5 | Ex. 6 | Ex. 7 | Ex. 8 | Ex. 9 | Ex. 10 | Cont. Run 11 | Cont. Run 12 | Cont. Run 13 | Cont. Run 14 |
|---|---|---|---|---|---|---|---|---|---|---|---|---|---|---|
| Components | | | | | | | | | | | | | | |
| TA-1 | 99 | 98.5 | 98.5 | 98 | 97 | 99 | 98.5 | 98.5 | 98 | 97 | 98 | 96 | 98 | 96 |
| Sn—OcLa | 0.5 | 0.5 | 1.0 | 1.0 | 2.0 | — | — | — | — | — | 2 | 4 | — | — |
| Sn—BuLa | — | — | — | — | — | 0.5 | 0.5 | 1.0 | 1.0 | 2.0 | — | — | 2 | 4 |
| TEA | 0.5 | 1.0 | 0.5 | 1.0 | 1.0 | 0.5 | 1.0 | 0.5 | 1.0 | 1.0 | 0 | 0 | 0 | 0 |
| Pot life (hrs) | 10 | 6 | 8 | 5 | 3 | 10 | 6.5 | 8 | 5 | 4 | 30 | 24 | 30 | 24 |
| Solidifying time (hrs) | 24 | 15 | 20 | 14 | 12 | 24 | 15 | 20 | 14 | 12 | 72 | 40 | 72 | 40 |
| Post-cure Tg (°C.) | 220 | 225 | 225 | 227 | 227 | 190 | 220 | 220 | 225 | 230 | 160 | 175 | 160 | 175 |

EXAMPLE 3

The procedures of Example 1 were repeated except that the components given in Table 3 were blended at room temperature. The pot life of the mixtures at 25° C. was measured. After each of the mixtures was cast into 1 cm×10 cm×10 cm at 25° C., solidifying time of each of the cast products after 16 hours was measured. The solidified products were post-cured in the same way as in Example 1. The post-cure Tg of the post-cured products were measured. The results are shown in Table 3.

TABLE 3

|  | Example 1 | Example 2 | Example 3 | Example 4 |
|---|---|---|---|---|
| Components |  |  |  |  |
| TA-1 | 80 | 80 | 70 | 70 |
| EP-871 | 20 |  | 15 |  |
| EP-TGX |  | 20 |  | 15 |
| NPG-DA |  |  | 15 | 15 |
| HQ |  |  | 0.02 | 0.02 |
| FeAC | 2.0 | 2.0 | 1.0 | 1.0 |
| TEA | 1.0 | 1.0 | 2.0 | 2.0 |
| Pot life (hrs) | 0.5 | 0.5 | 4 | 0.7 |
| Solidifying state | good | good | good | good |
| Post-cure Tg (°C.) | 133 | 200 | 160 | 180 |

EP-871: diglycidyl ester of dimer acid having a viscosity of 4–9 ps at 25° C., an epoxy equivalent of 390–470 and a specific gravity of 0.99 (Epikote 871, Yuka Shell Epoxy Co. Ltd.)
TP-TGX: N,N,N′,N′-tetraglycidyl-m-xylilene diamine having a viscosity of 25–30 ps at 25° C. and an epoxy equivalent of 95–110 (TETRAD X, Mitsubishi Gas Chemical Co., Inc.)
NPG-DA: neopentyl glycol dimethacrylate
HQ: hydroquinone
FeAC: ferric actyl acetonate

EXAMPLE 4

The procedures of Example 1 were repeated except that the components given in Table 4 were blended at 20° C.

The post life of the mixture at 20° C. was measured. The solidifying state after 15 hours was observed. The solidified products were post-cured in the same way as in Example 1. The post-cure Tg was measured. The results are shown in Table 4.

TABLE 4

|  | Ex. 1 | Ex. 2 | Ex. 3 | Ex. 4 | Ex. 5 | Ex. 6 |
|---|---|---|---|---|---|---|
| Components |  |  |  |  |  |  |
| TA-1 | 70 | 35 | 70 | 35 | 70 | 35 |
| EP-TGX | 15 | 7.5 | 15 | 7.5 | 15 | 7.5 |
| NPG-DA | 15 | 7.5 | 15 | 7.5 | 15 | 7.5 |
| BYK | 0.1 | 0.04 | 0.1 | 0.04 | 0.1 | 0.04 |
| SnAcAC | 2.0 | 2.0 |  |  |  |  |
| Sn—OcLa |  |  | 2.0 | 2.0 |  |  |
| Sn—BuLa |  |  |  |  | 2.0 | 2.0 |
| TEA | 4.0 | 2.0 | 4.0 | 2.0 | 4.0 | 2.0 |
| Al |  | 50 |  | 50 |  | 50 |
| Pot life (hrs) | 2 | 4 | 3 | 6 | 3 | 6 |
| Solidifying state | good | good | good | good | good | good |
| Post-cure Tg (°C.) | 200 | 205 | 220 | 223 | 217 | 220 |

BYK: defoaming agent (BYK-057, BYK Chemic Japan Co.)
Al: aluminum powder (300 mesh passed)

EXAMPLE 5

Phenol novolak cyanate (Mn=480, m.p.=48° C.) (60 parts) was heated to 50° C. To the resulting prepolymer were added 30 parts of EP-TGX, 10 parts of NPG-DA, 0.02 parts of HQ, 1.0 part of SnAcAC and 0.5 parts of TEA as in Example 3. The resulting mixture was cast into 1 cm×10 cm×10 cm. The cast product immediately cooled to 25° C. The cast product was kept at that temperature. The pot life of the product was 30 minutes at 25° C. The solidifying time of the cast product was 10 hours. The post-cure Tg of the post-cured product which had been post-cured as in Example 1 was 250° C.

Heating was critical in order to allow a cyanate ester compound to be cured in the presence of well known catalyst or curing agent, such as an organic metal salt, an organic metallic chelate, the other organic metal compound, or a primary or secondary amine. When these catalysts or curing agent are used in a large amount, gelation of the cyanate ester resin composition proceeds rapidly. This means that a pot life of the resin composition at a temperature of not more than 50° C. becomes short strikingly, and in addition, there was a possibility that runaway reaction may occur. Therefore, it was difficult in the prior to prepare a useful resin composition which is curable at a temperature of not more than 50° C., e.g. at room temperature.

On the other hand, the curing catalyst or curing agent system comprising triethanolamine and an organometallic compound and which is used in the cyanate ester resin of the present invention does not cause a runaway reaction even if it is used in an amount that would otherwise cause such a runaway reaction if an organometallic compound were used alone. In addition, the pot life of the present composition at a temperature of not more than 50° C. is relatively long and the time required for the primary curing can be shortened to 1–2 days. The post-cured product obtained by heating the primary cured material has higher glass transition temperature and thermal decomposition temperature.

Therefore, the present process can be used for preparing laminates, moldings, filament windings, coating materials, adhesives and cast products and for the other industrial applications.

What is claimed is :

1. A process for producing a cyanate ester resin cured product which comprises:
(i) a step of adding an organic metal compound (a) and triethanol amine (b) to a cyanate resin composition, which is flowable at a temperature of not more than 50° C., comprising a polyfunctional cyanate ester compound having at least two cyanato groups in its molecule as a main component, thereby forming a resin composition having 0.1–5% by weight of (a) and 0.1–5% by weight of (b), and which is flowable at a temperature of not more than 50° C.;
(ii) a step of molding the resin composition at a temperature of not more than 50° C.;
(iii) a step of primary curing of the resin composition at a temperature of not more than 50° C.;
(iv) a step of post-curing of the resin composition at a temperature of not less than 170° C.

2. The process of claim 1 wherein the organic metal compound (a) is used in an amount of 0.5–2% by weight.

3. The process of claim 1 wherein the triethanol amine (b) is used in an amount of 0.5–4% by weight.

4. The process of claim 1 wherein the polyfunctional cyanate ester compound is at least one compound represented by the formula:

$$R(OCN)_m \qquad (1)$$

wherein R is an aromatic organic group and the cyanato groups are directly bonded to the aromatic ring; and m is an integer of at least 2.

5. The process of claim 4 wherein said polyfunctional cyanate ester compound is selected from the group consisting of 1,3- or 1,4-dicyanatobenzene, 1,3,5-tricyanatobenzene, 1,3-, 1,4-, 1,6-, 1,8-, 2,6- or 2,7-dicyanatonaphthalene, 1,3,6-tricyanatonaphthalene, 4,4′-dicyanatobiphenyl, bis(4-dicyanatophenyl)methane, bis(3,5-dimethyl-4-dicyanatophenyl)methane, 2,2-bis(4-cyanatophenyl)propane, 2,2-bis(3,5-dichloro-4-cyanatophenyl)propane, 2,2-bis(3,5-dibrome-4-cyanatophenyl)propane, 2,2-bis(3,5-dimethyl-4- cyanatophenyl)propane, bis(4-cyanatophenyl)ether, bis(4-cyanatophenyl)ethane, bis(4-cyanatophenyl)-thioether, bis(4-cyanatophenyl)sulfone, tris(4-cyanatophenyl)phosphate, a polyfunctional novolak cyanate obtained by reacting a novolak with a halogenated cyanide, a polyfunctional polycarbonate cyanate obtained by reacting a hydroxy-terminated polycarbonate oligomer with a halogenated cyanide, a polyhydroxy styryl cyanate obtained by reacting hydroxy benzaldehyde with an alkyl-substituted pyridine, a styryl pyridine cyanate obtained by reacting a pyridine with a halogenated cyanide and a cyanate obtained by reacting a halogenated cyanide with a polyfunctional phenol in which the phenol is bonded to dicyclopentadiene.

6. The process of claim 1 wherein the organic metal compound is metal salts of organic acid of at least one metal selected from the group consisting of zinc, lead, nickel, iron, tin and cobalt.

7. The process of claim 1 wherein the organic metal compound is organic metallic chelate of at least one metal selected from the group consisting of zinc, lead, nickel, iron, tin and cobalt.

8. The process of claim 1 wherein the organic metal compound is alkyl metal oxide of at least one metal selected from the group consisting of zinc, lead, nickel, iron, tin and cobalt.

* * * * *